(12) United States Patent
Malinoski et al.

(10) Patent No.: US 8,420,747 B2
(45) Date of Patent: Apr. 16, 2013

(54) ALIPHATIC POLYCARBONATES FOR USE IN THERMOSETTING POWDER COATINGS

(75) Inventors: Jon M Malinoski, Evansville, IN (US); Paul D Sybert, Evansville, IN (US); Christopher Michael Eastman, Ballston Lake, NY (US); Sumeet Jain, Niskayuna, NY (US); Rainer Koeniger, Clifton Park, NY (US); Michael Todd Luttrell, Clifton Park, NY (US); Glen David Merfeld, Niskayuna, NY (US); James Edward Pickett, Schenectady, NY (US); Jason Joseph Testa, Simpsonville, SC (US)

(73) Assignee: Sabic Innovative Plastics IP B.V. (NL)

( * ) Notice: Subject to any disclaimer, the term of this patent is extended or adjusted under 35 U.S.C. 154(b) by 580 days.

(21) Appl. No.: 12/600,079

(22) PCT Filed: Jul. 17, 2008

(86) PCT No.: PCT/US2008/070339
§ 371 (c)(1),
(2), (4) Date: Nov. 13, 2009

(87) PCT Pub. No.: WO2009/012391
PCT Pub. Date: Jan. 22, 2009

(65) Prior Publication Data
US 2010/0216917 A1    Aug. 26, 2010

Related U.S. Application Data

(63) Continuation of application No. PCT/US2008/070339, filed on Jan. 17, 2008, now abandoned.

(60) Provisional application No. 12/175,053, filed on Jul. 17, 2008, provisional application No. 60/950,178, filed on Jul. 17, 2007.

(51) Int. Cl.
| | |
|---|---|
| C08F 283/00 | (2006.01) |
| C08F 283/02 | (2006.01) |
| C08K 5/34 | (2006.01) |
| C08K 5/3435 | (2006.01) |
| C08K 5/3492 | (2006.01) |
| B05D 3/02 | (2006.01) |
| B05D 1/22 | (2006.01) |
| B05D 7/24 | (2006.01) |

(52) U.S. Cl.
USPC ........ 525/461; 427/385.5; 427/461; 427/485; 524/99; 524/100; 524/612; 525/124

(58) Field of Classification Search ............... 427/385.5, 427/461, 485; 524/99, 100, 612; 525/124, 525/461
See application file for complete search history.

(56) References Cited

U.S. PATENT DOCUMENTS

| | | | |
|---|---|---|---|
| 4,196,186 | A | 4/1980 | Bogoch |
| 5,464,590 | A | 11/1995 | Yount et al. |
| 5,795,950 | A | 8/1998 | Sugimoto et al. |
| 6,423,777 | B1 * | 7/2002 | Laas et al. ..................... 525/127 |
| 2006/0121204 | A1 * | 6/2006 | Nakae et al. ................... 427/402 |
| 2008/0167430 | A1 | 7/2008 | Bruchmann et al. |

OTHER PUBLICATIONS

International Search report for International Application No. PCT/US2008/070339, mailed Nov. 24, 2008, 2 pages.

* cited by examiner

Primary Examiner — Bijan Ahvazi
(74) Attorney, Agent, or Firm — Cantor Colburn LLP

(57) ABSTRACT

A thermosetting polymer material capable of being used in powder coatings. The thermosetting polymer material includes at least one hydroxyl functional aliphatic polycarbonates that is formulated and crosslinked with isocyanates to yield a thermoset organic coating material. These materials provide improved weatherability as compared to prior art powder coating materials while also being less expensive than prior art materials utilizing fluorinated polymers.

24 Claims, No Drawings

ALIPHATIC POLYCARBONATES FOR USE IN THERMOSETTING POWDER COATINGS

CROSS REFERENCE TO RELATED APPLICATIONS

This application is a National Stage Application which claims priority to PCT Application No. PCT/US2008/070339 filed on Jul. 17, 2008 which claims priority to U.S. patent application Ser. No. 12/175,053 filed on Jul. 17, 2008, now abandoned, and U.S. Provisional Application 60/950,178 filed on Jul. 17, 2007.

FIELD OF INVENTION

The present invention relates to powder coatings and, in particular, to polycarbonate-based materials for use in thermosetting powder coatings for use on substrates that are weatherable and/or thermostable.

BACKGROUND OF INVENTION

The use of polymers has grown substantially with time. Polymers are now being used in many areas previously occupied by metals, glass and/or other materials. As a result, polymers are now exposed to a variety of elements that normally cause polymers to degrade, such as ultraviolet ("UV") light. As such, it has been a goal to provide polymers having improved weatherability such that these polymers are better able to maintain their visual and/or structural usefulness for greater periods of time.

In one prior art solution, the use of polyesters containing resorcinol arylate chain members has been utilized to provide good resistance to the yellowing and/or loss of gloss that occurs when polyesters are exposed to UV light, and thus are considered to possess good "weatherability." The arylate moieties in these polymers typically contain isophthalate, terephthalate, and mixtures of isophthalate and terephthalate. Polyesters of resorcinol arylates can provide effective protection against yellowing and loss of gloss when coated over a resinous substrate.

Another solution has been in the creation of thermosetting fluororesin coating materials that offer effective weather resistance. These thermosetting fluororesin coating materials are used in many outdoor structures, such as gates, fences, building materials and automobiles. These materials have been applied in a coating form and are capable of being used to achieve a gloss finish or a matte finish.

However, when used in a powder coating, these fluororesins typically display lower surface hardness. Furthermore, these fluororesins are significantly more costly than conventional powder coatings. Finally, as the name suggests, these resins contain fluorine, which may cause disposal issues (either of the coating or the entire coated article at the end of its lifetime). Therefore, customer acceptance is limited for these coatings and they only hold a small market share despite their outstanding weatherability.

Accordingly, it would be beneficial to provide a polymer coating material that is capable of being used in a powder coating system. It would also be beneficial to provide a polymer coating that exhibits improved weatherability characteristics while also being capable of providing a selected coating finish.

SUMMARY OF THE INVENTION

The present invention addresses the issues associated with the prior art by providing a thermosetting polymer material capable of being used in powder coatings. The polymer material provides improved weatherability as compared to prior art powder coating materials while also being less expensive than prior art materials utilizing fluorinated polymers. The present invention achieves one or more of these benefits using hydroxyl functional aliphatic polycarbonates that are formulated and crosslinked with isocyanates to yield a thermoset organic coating capable of being used in powder coatings.

Accordingly, in one aspect, the present invention provides a curable powder coating composition including (i) an aliphatic or cycloaliphatic polycarbonate or a combination including at least one of the foregoing polycarbonates, and wherein the polycarbonate has repeating carbonate units of Formula II:

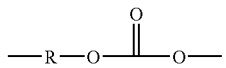

wherein R is a divalent $C_1$-$C_{30}$ aliphatic radical or a divalent $C_3$-$C_{30}$ cycloaliphatic radical, wherein the polycarbonate includes at least one reactive hydroxyl group; wherein the polycarbonate has an equivalent molecular weight in a range from 500 grams per mole to 10,000 grams per mole, further wherein the polycarbonate has a Tg in a range from 25° C. to 100° C., further wherein the polycarbonate is present in an amount corresponding to from 30 weight percent to 90 weight percent of a total weight of the composition; and (ii) an isocyanate crosslinking agent having at least one isocyanate functional group, wherein a ratio of isocyanate functional groups to reactive hydroxyl groups of the polycarbonate is in a range of from 0.5:1 to 1.5:1, wherein the composition is a curable powder coating composition.

In another aspect, the present invention provides a method of forming a coated substrate including the steps of (a) providing a substrate; (b) coating the substrate with a curable coating composition to provide a curable coated substrate, wherein the curable coating composition includes (i) an aliphatic or cycloaliphatic polycarbonate or a combination including at least one of the foregoing polycarbonates, and wherein the polycarbonate has repeating carbonate units of Formula II:

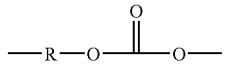

wherein R is a divalent $C_1$-$C_{30}$ aliphatic radical or a divalent $C_3$-$C_{30}$ cycloaliphatic radical, wherein the polycarbonate includes at least one reactive hydroxyl group; wherein the polycarbonate has an equivalent molecular weight in a range from 500 grams per mole to 10,000 grams per mole, further wherein the polycarbonate has a Tg in a range from 25° C. to 100° C., further wherein the polycarbonate is present in an amount corresponding to from 30 weight percent to 90 weight percent of a total weight of the composition; and (ii) an isocyanate crosslinking agent having at least one isocyanate functional group, wherein a ratio of isocyanate functional groups to reactive hydroxyl groups of the polycarbonate is in a range of from 0.5:1 to 1.5:1; and (c) curing the curable coated substrate at a temperature ranging from 100° C. to 250° C.

In yet another aspect, the present invention provides a cured composition having structural units derived from (i) an aliphatic or cycloaliphatic polycarbonate or a combination including at least one of the foregoing polycarbonates, and wherein the polycarbonate has repeating carbonate units of Formula II:

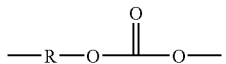

wherein R is a divalent $C_1$-$C_{30}$ aliphatic radical or a divalent $C_3$-$C_{30}$ cycloaliphatic radical, wherein the polycarbonate includes at least one reactive hydroxyl group; wherein the polycarbonate has an equivalent molecular weight in a range from 500 grams per mole to 10,000 grams per mole, further wherein the polycarbonate has a Tg in a range from 25° C. to 100° C., further wherein the polycarbonate is present in an amount corresponding to from 30 weight percent to 90 weight percent of a total weight of the composition; and (ii) an isocyanate crosslinking agent having at least one isocyanate functional group, wherein a ratio of isocyanate functional groups to reactive hydroxyl groups of the polycarbonate is in a range of from 0.5:1 to 1.5:1.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

The present invention provides a thermosetting polymer material that is capable of being used in powder coatings. The powder coatings provide improved weatherability as compared to prior art powder coating materials. The thermosetting polymer material includes at least one hydroxyl functional aliphatic polycarbonate compound that is formulated and crosslinked with one or more isocyanates to yield the thermoset coating material. These materials may then be used in powder coatings to coat any article capable of being coated with a powder coating and/or any article that would benefit from the enhanced weatherability. In addition, due to the costs associated with fluorinated polymers used in prior art materials, the thermoset coating materials of the present invention can provide a less expensive solution to weatherable powder coating materials.

Accordingly, in one aspect of the present invention, the thermoset coating material includes a polycarbonate material. In select embodiments, the polycarbonate material is an aliphatic polycarbonate. As used herein, an "aliphatic polycarbonate" is used to include aliphatic polycarbonate materials, cycloaliphatic polycarbonate materials, or a combination thereof. Aliphatic carbonates utilized in the present invention provide hydrolytic and oxidative stability as well as being substantially transparent to UV light. As such, these materials provide enhanced degradation protection against water, oxygen and sunlight thereby enhancing the weatherability of the powder coating.

In beneficial embodiments of the present invention, the aliphatic polycarbonate material is one that includes an average of more than one reactive hydroxyl groups per molecule. The hydroxyl groups permit the aliphatic polycarbonate materials to be formulated and/or crosslinked with the blocked isocyanate to form the thermoset coating material. In an alternative embodiment, the aliphatic polycarbonate material used in the present invention has an average of two reactive hydroxyl groups per molecule (i.e., a functionality of about 2).

The aliphatic polycarbonate materials used in the present invention can include any aliphatic polycarbonate material capable of being formed into a thermoset coating material that is then capable of being formed into a powder for use in a powder coating. Nevertheless, in a select embodiment of the present invention, the aliphatic polycarbonate material includes an aliphatic polycarbonate that is derived from a compound having formula I $$HO-R-OH \qquad \text{Formula I}$$

wherein R is a divalent $C_1$-$C_{30}$ aliphatic radical or a divalent $C_3$-$C_{30}$ cycloaliphatic radical. Examples of compounds of Formula I include, but are not limited to, linear or cyclic aliphatic alcohols such as neopentyl glycol, hexane diol, hydrogenated bisphenol A, cyclohexanediol, cyclohexane dimethanol, decahydronaphthalene dimethanol, norbornene dimethanol, tetramethylcyclobutanediol, tricyclodecane dimethanol, isosorbide or a combination including at least one of the foregoing aliphatic alcohols.

The aliphatic polycarbonate composition comprises aliphatic-containing units that may comprise aliphatic carbonate units. The aliphatic carbonate units may also be referred to as polycarbonate units or aliphatic polycarbonates. As used herein, the terms "aliphatic polycarbonate", "aliphatic polycarbonate resin", and "aliphatic polycarbonate unit" mean a composition having repeating structural carbonate units of the formula (II):

(II)

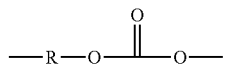

wherein R is a divalent $C_1$-$C_{30}$ aliphatic radical or a divalent $C_3$-$C_{30}$ cycloaliphatic radical.

The aliphatic polycarbonates described herein may be prepared by reacting a carbonic acid derivative, e.g. diphenyl carbonate, dimethyl carbonate, diethyl carbonate, bis(methyl salicyl)carbonate, phosgene, with a diol or dihydroxy, such as the compound of Formula I. The reactions may be preformed by melt, interfacial or solution polymerizations, as known in the art. Generally, in the melt polymerization process, aliphatic polycarbonates may be prepared by co-reacting, in a molten state, the dihydroxy reactant(s) (i.e., the aliphatic alcohol of Formula I) and a dialkyl carbonate ester, such as methyl carbonate or ethyl carbonate, in the presence of a transesterification catalyst in a CSTR (continuous stirred tank reactor), Helicone (by Design Integrated Technology, Inc), sloped tray reactors (U.S. Pat. Nos. 4,196,186 and 5,464,590 assigned to Eastman Kodak Company), Zimmer disc/ring reactors, Karl Fischer horizontal cage reactor, Banbury® mixer, twin screw extruder, or the like or combinations of the aforementioned reactors to form a uniform mixture. Volatile monohydric alcohol or phenol is removed from the molten reactants by distillation and the polymer is isolated as a molten residue. A specifically useful melt process for making aliphatic carbonate units uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, exemplary transesterification catalysts may include quaternary ammonium or phosphoniums catalysts of formula $(R)_4Q^+X$, wherein each R is the same or different, and is a $C_{1-10}$ alkyl group; and Q is a nitrogen or phosphorus atom; and X is a hydroxide or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is a $C_{1-8}$ alkoxy group, a $C_{6-18}$ aryloxy group, hydroxide. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

In one embodiment, an exemplary method for forming aliphatic carbonate units uses alkyl carbonate esters. Examples of specifically useful dialkyl carbonate esters include dimethyl carbonate, diethyl carbonate, or propyl carbonate, dibutyl carbonate, or a combination comprising at least one of the foregoing. In addition, exemplary transesterification catalysts may include quaternary ammonium or phosphoniums catalysts of formula $(R)_4Q^+X$, wherein each R, Q, and X are as defined above. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. In another embodiment, exemplary transesterification catalyst may include alkali metal hydroxides. Examples of specifically useful alkali metal hydroxides include sodium hydroxide, potassium hydroxide, lithium hydroxide, or a combination comprising at least one of the foregoing. In another embodiment, exemplary transesterification catalyst may include alkali metal alkoxide. Examples of specifically useful alkali metal alkoxide include sodium methoxide, potassium methoxide, lithium methoxide, sodium ethoxide, potassium ethoxide, and lithium ethoxide. In still another embodiment, a combination of quaternary ammonium or phosphoniums hydroxides and an alkali metal alkoxide is used.

Volatile monohydric alcohol may be removed from the molten reactants by distillation and the polymer is isolated as a molten residue.

With the transesterification reactions, the molecular weight and the percentage of hydroxyl endgroups in the aliphatic polycarbonates of this invention are controlled by controlling the ratio of the incorporated carbonic acid derivative to diol and the extent of reaction. The incorporated carbonic acid derivative to diol ratio is controlled by a combination of factors including but not limited to the ratio of charged carbonic acid derivative to diol to the reactor, the vapor pressure of the monomers versus the monohydric alcohol or phenol formed, the reaction temperature and pressure, and reactor design. In one embodiment, multiple or continuous addition of the dialkyl carbonate during the polymerization reaction is used to increase the incorporated carbonic acid derivative to diol ratio especially where the carbonic acid derivative may co-distill with the monohydric alcohol. In this embodiment, the diols, a portion of the dialkyl carbonate and the catalysts are charged to reactor. During the removal monohydric alcohol additional dialkyl carbonate is added either continuously or in discrete increments to achieve the desired MW and endgroup levels. The reaction temperatures for transesterification are from 50 to 250° C. in one embodiment, 80 to 220° C. in another embodiment and between 120 and 200° C. in still another embodiment. The reaction pressures in the initial stages are at 50 PSI to −5 PSI, beneficially at 5 PSI to atmospheric. In the latter stages of the polymerization build the reactor pressure is decreased either gradually or stepwise to 100 to less than 1 torr in one embodiment, 50 to less than 1 torr in another embodiment, or 5 to less than 1 torr in yet another embodiment. One skilled in the art of transesterification polymerization can control these above-mentioned factors to prepare the compositions of this invention.

The aliphatic polycarbonate prepared by the melt transesterification reaction using at least one alkali metal hydroxides, alkali metal alkoxide, quaternary ammonium or phosphoniums catalysts may contain basic ionic species at the completion of the polymerization reaction. In some embodiments, these basic species can lead to increased rates of hydrolysis or less than acceptable heat aging performance. Therefore, in one embodiment, the aliphatic polycarbonate composition is dissolved in a water immiscible solvent. Non-limiting examples of suitable solvents include toluene, xylenes, chlorobenzene, dichlorobenzenes, chloroform, methylene chloride, and mixtures thereof. The aliphatic polycarbonate solution is then acidified with a water-soluble acid. Non-limiting examples of suitable acids include aqueous HCL, HBr and phosphoric acid. After the acidification, the polymer solution is washed with water to remove residual acid and ionic species. Equipment for the washing of organic phases with aqueous phases is well known in the art and these can be used in the present invention. These include, but are not limited to, liquid-liquid centrifuges, decanters, mixer-settler tanks and the like. Methods for the isolation of the aliphatic polycarbonate from the organic solvent are well known in the art. Non-limiting examples include anti-solvent precipitation, devolatilization extruders, wipe film evaporators and removal of the solvent in stirred tanks.

In one embodiment, an exemplary method for forming aliphatic carbonate units uses the transesterification reaction of alkyl carbonate esters and diols catalyzed by quaternary ammonium hydroxide catalysts. The catalysts are chosen such that they suitable stable at the transesterification temperature but decomposes at higher temperatures. Using this procedure, the aliphatic polycarbonate composition prepared can be but may not need to be purified with acid and water washed as described above. This includes catalysts such as tetraethyl ammonium hydroxide. The transesterification reactions are performed using the quaternary ammonium hydroxide catalysts at the reaction temperatures for transesterification are from 50 to 180 C, preferable from 80 to 160 C and most preferable between 120 and 160 C. The reaction pressures in the initial stages are at 50 PSI to −5 PSI in one embodiment and 5 PSI to atmospheric in an alternative embodiment. In the latter stages of the polymerization build the reactor pressure is decreased either gradually or stepwise to 100 to less than 1 torr, more preferable 50 to less than 1 torr or most preferable 5 to less than 1 torr Additional quaternary ammonium hydroxide can be added as needed during the reaction. At the completion of the reaction the temperature is increased to decompose the catalyst into trialkyl amine and water or an alcohol. The decomposition is preformed at temperatures of 180 to 300° C., more preferable at temperatures of 180 and 250° C. The reaction pressure can be maintained at slightly above atmospheric to less than 1 torr in one embodiment, between 200 to less than 1 torr in another embodiment and between 100 and less than 1 torr in yet another embodiment.

The aliphatic polycarbonate materials used in the present invention can also include blends of an aliphatic polycarbonate material with another resin. Examples of resins that may be blended with the aliphatic polycarbonate material include, but are not limited to, polyesters, super durable polyesters, acrylics, polyvinylidene difluoride (PVDF), fluorinated ethylene vinyl ether (FEVE), or a combination thereof.

A curable powder coating composition comprises a hydroxyl functional aliphatic polycarbonate resin and an isocyanate crosslinking agent. Reaction between the hydroxyl functional aliphatic polycarbonate resin and isocyanate crosslinking agent during the thermal cure step results in a networked thermoset resin coating. Powder coating quality and performance can be enhanced by the addition of flow aids, degassing agents, UV light absorbers or hindered amine light stabilizers (also know as HALs), and reaction catalysts to the powder coating composition. The hydroxyl functional aliphatic polycarbonate resin, isocyanate crosslinking agent, and other additives are blended together via a melt extrusion process which results in a homogenous solid flake material. The melt extrusion step must be performed at temperatures below those required to initiate the thermal crosslinking reaction. The melt extruded powder coating flake material is ground into fine particles, ranging in size from 1 to 1000 microns in diameter. The most advantageous particle size for powder coating application is between 30 and 80 microns in diameter to ensure a uniform coated surface. The Tg of the aliphatic polycarbonate resin and subsequent powder coating formulation must be sufficiently higher than ambient temperatures to prevent agglomeration of the ground particles and to enable a smooth coated surface. The powder coating formula is applied to the substrate via electrostatic spray coating or fluidized bed methods, followed by a thermal cure step to form the molten resin coating and complete the crosslinking reaction.

Powder coating materials or formulations are often flaked, ground or pelletized. During shipment and storage, especially in warm climates, low Tg materials can fuse or otherwise lose their ability to flow freely. Thus, it is important that the Tg is sufficiently above room temperature. During processing and formulation the compositions often need to be melt mixed with other additives such as crosslinking agents, UV agents and the like. Therefore, it is beneficial that the Tg is sufficiently below where the crosslinking agents begin to react. Thus, in addition to including one or more hydroxyl groups, in select embodiments, it is beneficial for the aliphatic polycarbonate materials, or blends thereof, to have a glass transition temperature (Tg) greater than room temperature. In one embodiment, the aliphatic polycarbonate materials used in the present invention have a glass transition temperature (Tg) between 25° C. and 100° C. In another embodiment, the aliphatic polycarbonate materials used in the present invention have a glass transition temperature (Tg) between 40° C. and 90° C. In yet another embodiment, the aliphatic polycarbonate materials used in the present invention have a glass transition temperature (Tg) between 50° C. and 80° C. Having a glass transition temperature in these ranges helps to provide a material that is capable of being formed into a freely flowing powder, thereby better enabling the material to be used in a powder coating process.

In addition, in select embodiments, it is beneficial for the aliphatic polycarbonate materials, or blends thereof, to have a low molecular weight. The molecular weight can be expressed in terms of an equivalent molecular weight where the equivalent MW as used here is defined as the mass of the composition divided by the number of hydroxyl groups. The equivalent MW can be obtained by several methods such as NMR and/or titration. In one embodiment, the aliphatic polycarbonate materials used in the present invention have an equivalent molecular weight of 500 to 10,000 grams per mole. In another embodiment, the aliphatic polycarbonate materials used in the present invention have an equivalent molecular weight of 1000 to 7,000 grams per mole. In yet another embodiment, the aliphatic polycarbonate materials used in the present invention have an equivalent molecular weight of 1000 to 6,000 grams per mole. In still another embodiment, the aliphatic polycarbonate materials used in the present invention have an equivalent molecular of 1000 to 4,000 grams per mole. Having a lower functional molecular weight helps to provide a material that yields higher crosslink densities, thereby enabling the material to be used in a thermoset powder coating system. In addition, the lower functional molecular weight provides for lower melt viscosities during the curing and coating steps, which enables the formation of smooth final coating.

In addition, in select embodiments, it is beneficial for the aliphatic polycarbonate materials to contain branching units. The branching units can increase the overall final crosslink densities, thereby enabling the material to be used in a thermoset powder coating process. The branching level is adjusted to improve the melt viscosity of the polycarbonate composition, and the toughness and scratch resistance of the cured thermoset coating. The branching units can be incorporated through the use tri- and tetra-functional alcohols. Exemplary branching agents are aliphatic alcohols, specifically tri- and tetra-primary functional alcohols. Examples of branching agents for use in aliphatic polycarbonate materials in the present invention include, but are not limited to, 2-ethyl-2-(hydroxymethyl)propane-1,3-diol, pentaerythritol, 1,2,4-cyclohexanetrimethanol, 1,3,5-cyclohexanetrimethanol, and 1,2,4,5-cyclohexanetetramethanol. In one embodiment, the aliphatic polycarbonate materials used in the present invention have a branching level of 0.5 to 5 mol percent. In another embodiment, the aliphatic polycarbonate materials used in the present invention have a branching level of 0.5 to 3 mol percent. In yet another embodiment, the aliphatic polycarbonate materials used in the present invention have a branching level of 1 to 3 mol percent.

The amount of aliphatic polycarbonate materials, including blends thereof, can vary depending on various factors. In one embodiment, the aliphatic polycarbonate materials constitute 30% or greater by weight of the thermoset coating material. In one embodiment, the thermoset coating material includes from 30 to 90 wt % of the aliphatic polycarbonate material. In another embodiment, the thermoset coating material includes from 50 to 90 wt % of the aliphatic polycarbonate material. In yet another embodiment, the thermoset coating material includes from 65 to 85 wt % of the aliphatic polycarbonate material.

In another aspect, the thermoset coating materials of the present invention include an isocyanate crosslinking agent. In select embodiments of the present invention, the isocyanate crosslinking agent has at least one isocyanate functional group. The isocyanate functional group is selected to be reactive with hydroxyl groups. As such, the isocyanate functional group reacts with the hydroxyl group of the aliphatic polycarbonate material to form the thermoset coating material.

As the isocyanate crosslinking agent includes one or more isocyanate functional groups designed to react with the hydroxyl group of the aliphatic polycarbonate material, the isocyanate crosslinking agent beneficially includes a sufficient number of isocyanate functional groups to ensure that, after the reaction with the reactive hydroxyl groups, the resulting material will form an acceptable coating. Accordingly, in select embodiments, the ratio of isocyanate functional groups on the isocyanate crosslinking agent to the reactive hydroxyl groups of the polycarbonate is in a range of from 0.5:1 to 1.5:1.

Any isocyanate crosslinking agent that includes one or more isocyanate functional groups that are capable of reacting with a hydroxyl group may be used in the present invention. Examples of isocyanate crosslinking agents that may be used include, but are not limited to, acyl ureas, sulfonyl ureas, carbamates, thiocarbamates, and combinations thereof. Specific examples of isocyanate crosslinking agents that may be used include, but are not limited to, hexamethylene diisocyanate, isophorone diisocyanate, 4,4'-dicyclohexyl methane diisocyanate, (TMXDI), oligomers and blocked derivatives thereof.

In addition to the aliphatic polycarbonate material and the isocyanate crosslinking agent, the thermoset coating materials may include various additives ordinarily incorporated in compositions of this type. Mixtures of additives may be used. Such additives may be mixed at a suitable time during the mixing of the components for forming the composition. Examples of additional additives include, but are not limited to, gloss reducing additives, cure catalysts, flow and leveling agents, degassing additives, adhesion promoters, dispersion aids, flame-retardant agents, heat stabilizers, light stabilizers, antioxidants, plasticizers, antistatic agents, ultraviolet (UV) absorbers, lubricants, pigments, dyes, colorants, or combinations including one or more of the foregoing additives.

For highly weatherable or UV resistant compositions, the addition of hindered amine light stabilizers (HALS) are of special interest. Unlike UV absorbers, HALS absorb no light in the near UV. HALS include compounds bearing a 2,2,6,6-tetrasubstituted piperidine moiety. These materials are described in Plastics Additives Handbook 5th Edition, H. Zweifel, ed., Hanser Publishers (2001) (pp. 123-136) and in UV Stabilizers in Vol 8 of the Encyclopedia of Polymer Science and Technology, John Wiley & Sons, Inc (pp 14-27). Some non-limiting examples of these include, but are not limited to, bis(2,2,6,6-tetramethyl-4-piperidyl) sebacate (Tinuvin™ 770) and 2-[(2-Hydroxyethyl)amino]-4,6-bis[N-(1cyclohexyloxy-2,2,6,6-tetramethylpiperidin-4-yl)]butylamino-1,3,5-triazine (Tinuvin™ 152).

The thermoset coating materials may be formed using any method capable of forming thermoset coating materials for use in powder coatings. In general, the isocyanate crosslinking agent is mixed with the aliphatic polycarbonate material and any selected additives in a manner sufficient to ensure substantially homogenous dispersion or dissolution of all the ingredients to form the thermosetting coating material. Typically this is achieved by dry-mixing the ingredients followed by melt-mixing in an extruder or similar equipment.

The resulting thermoset coating materials may be applied as part of a powder coating to any substrate capable of being coated with a powder coating. Examples of substrates that may be coated include, but are not limited to, glass, plastic, wood, metal, ceramics or a combination of including at least one of the foregoing substrates. These substrates may then be used as part of any number of different articles. Examples of articles that may be coated with the thermoset coating materials include, but are not limited to, architectural applications such as gate materials, fencing materials, building and roof panels, window frames, door knobs, light posts, light enclosures, automobile parts, such as body panels, wheels, suspension components and the like, sporting goods or any other substrate in which the enhanced weatherability of the thermoset coating materials of the present invention may be utilized.

The thermoset coating materials of the present invention may be applied to these articles using any method capable of applying a powder coating to a substrate. Since powder coatings are a type of dry coating, they are generally applied as a free-flowing, dry powder without the use of a solvent. In one embodiment, the coating is typically applied electrostatically and is then cured under heat to allow it to flow and form the resulting coating. Examples of such methods include, but are not limited to, spray coating and fluidized bed coating.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

EXAMPLES

All reagents were used as purchased from Aldrich, Fluka, Eastman Chemicals or ACROS Organics. Tg was determined using differential scanning calorimetry (DSC) with a TA Instruments Q1000 and an indium standard for calibration. Molecular weights were determined by gel permeation chromatography (GPC) using either a Perkin-Elmer 200 Series with a Polymerlabs mixed bed C column, calibrated with polystyrene standards from 580 to 3.05M peak molecular weights, and chloroform with 0.2% isopropanol as an eluent or a Waters 2695 LC with 2 Mixed-bed, Waters HRSE columns, calibrated with polystyrene standards from 214 to 133 KDa peak molecular weights, and dichloromethane as an eluent.

Example 1

Small Scale Synthesis of 1:4 CHDM:TCDDM—To a 250 mL 3-neck round bottom flask equipped with an overhead stirrer, a distillation apparatus and a temperature probe was added 1,4-cyclohexanedimethanol (CHDM, 12.21 g, 84.65 mmol), 4,8-bis(hydroxymethyl)-tricyclo[$5.2.1.0^{2,6}$] decane (TCDDM, 66.47 g, 338.61 mmol) and a 25% sodium methoxide solution in methanol (1.09 g, 5 mmol) and the mixture was heated to an internal reaction temperature of 80° C. Once this temperature was reached, diethyl carbonate (51.3 mL, 423.26 mmol) was added in portions. Initially 20 mL of diethyl carbonate was added and the reaction heated to 123° C. for 30 min. After this time, additional diethyl carbonate (15 mL) was added while the reaction was maintained at 123° C. for a further 25 min. The remaining diethyl carbonate (16.3 mL) was added at 123° C. and stirred for 25 additional min before the temperature was raised to 130° C. for 30 min and finally to 140° C. for 1 h. (35 mL of distillate was recovered as measured in a 50 mL graduated cylinder). After this time, the reaction was cooled to 105° C. and additional diethyl carbonate (~5 mL, 0.1 eq) was added, the reaction temperature was increased to 123° C. for 15 min, 130° C. for 15 min, 140° C. for 30 min, 150° C. for 15 min, 160° C. for 30 min, 180° C. for 30 min and finally 200° C. for 15 min. (6 mL additional distillate was recovered as measured in a 50 mL graduated cylinder). The overhead stirrer, distillation apparatus and temperature probe were removed and the flask equipped with a short path distillation column. (It was ensured that the remaining two necks of the flask were sealed). House vacuum was applied for ~10 min while heating. The distillation head was removed and the round bottom flask was re-equipped with the overhead stirrer, distillation column and temperature probe. The reaction was diluted with toluene (120 mL) and heated to 180° C. for 45 min. (94 mL toluene distillate was recovered as measured in a 150 mL graduated cylinder). After this time, the reaction was allowed to cool down to 105° C. before diluting the reaction mixture with toluene (150 mL) to dissolve the polymer (with continued stirring). The organic layer was washed with a 0.2 N aqueous sulfuric acid solution (2×100 mL) and brine (100 mL). The organic layer was recovered and concentrated under reduced pressure to afford an oil which was poured onto Teflon® coated aluminum foil to dry at 100° C. over night under reduced pressure yielding a glassy solid having the following properties: Mw=9847, Mn=3546, Polydispersity (PDI)=3.19, Tg=52° C.

Example 2

Medium Scale Synthesis of 1:4 CHDM:TCDDM—A 1000 mL three-neck round bottom flask was fitted with an overhead stirrer and a Dean-Stark distillation receiver, and placed into an oil bath. The flask was charged with 4,8-bis(hydroxymethyl)tricyclo(5.2.1.0$^{2,6}$)decane (270.34 g, 1.377 mol), 1,4-bis(hydroxymethyl)cyclohexane (49.64 g, 0.344 mol), and sodium methoxide (0.932 g, 17.25 mmol) dissolved in 6 mL methanol. The reactor was purged with nitrogen for 5 minutes, and then warmed to 90° C. while stirring. The flask was then charged with diethyl carbonate (213.47 g, 1.807 mol) and allowed to stir at 90° C. for 30 minutes. The reaction temperature was raised to 130° C. at a rate of 1° C./min and stirred at 220 RPM for 3 hours. The reaction volatiles were collected in the Dean-Stark trap (140 mL collected through 3 hours). After this time, additional diethyl carbonate (21.5 g, 0.181 mol) was added and the reaction warmed to 180° C. at a rate of 0.5° C./min. The reaction was allowed to stir at 180° C. for an additional 30 minutes, during which time 65 mL volatiles were collected. The Dean-Stark set-up was then removed and the reactor fitted with a vacuum distillation trap. The pressure in the reaction vessel was gradually reduced (to prevent foaming or bumping) to 0.3-0.5 torr at 180° C. and stirred for 20 minutes. The vacuum was closed and nitrogen introduced into the reactor to raise the pressure to 1 atm. The vacuum distillation trap was then replaced with a water-cooled condenser under nitrogen purge. Additional diethyl carbonate (5.00 g, 0.042 mmol) was added to the reactor and allowed to reflux at 180° C. for 15 minutes. The condenser was replaced with a vacuum distillation trap and the reactor pressure was reduced to 0.3-0.5 torr, The mixture was then stirred at 180° C. for 60 minutes, during which time the viscosity and stirring torque increased. Once the viscosity build was complete, the reactor was returned to atmospheric pressure via nitrogen and removed from the hot oil bath, The resin was quickly poured from the reactor into an aluminum pan, yielding 323.3 g of a brittle solid. Total distillate collected was 205 mL at 1 atm and 25 mL under vacuum. The sample had Mw of 8746, Mn of 3134 and a Tg of 50° C. The proton NMR indicated that the end groups were 97% OH. The equivalent MW is ~1615.

Example 3

Synthesis of 1:1 CHDM:TCDDM—A Similar Procedure to that of Examples 1 & 2 was performed with a 1:1 molar ratio of 4,8-bis(hydroxymethyl)tricyclo(5.2.1.0$^{2,6}$)decane and 1,4-bis(hydroxymethyl)cyclohexane to give a substantially hydroxyl terminated composition with a MW of 2850, an equivalent MW of 1,425 and a Tg of 42° C.

Example 4

1:1 CHDM:TMCBD—To a 250 mL 3-neck round bottom flask equipped with an overhead stirrer, a distillation apparatus and a temperature probe was added 1,4-bis(hydroxymethyl)cyclohexane (CHDM, 24.41 g, 169.3 mmol), tetramethylcyclobutanediol (TCDDM, 24.41 g, 169.3 mmol) and a 25% sodium methoxide solution in methanol (1.09 g, 5 mmol) and the mixture heated to an internal reaction temperature of 90° C. Once this temperature was reached, diethyl carbonate (40 g, 339 mmol) was added in portions. Initially 15 mL of diethyl carbonate was added and the reaction heated to 120° C. for 30 min. The mixture was cooled to 100 C, and after this time additional diethyl carbonate (15 mL) was added and the reaction was heated to 120° C. for a further 30 min. It was again cooled to 100° C. and the remaining diethyl carbonate (11 mL) was added and the temperature was again increased to 120° C. and stirred for 30 additional min before the temperature was raised to 140° C. for 1 hr., 160° C. for 1 hr and finally to 180° C. for 0.5 h, during which the distillate was continuously removed. The reaction was diluted with toluene (40 mL) and heated to 160° C. for 30 min (35 mL toluene distillate was recovered). After this time the temperature probe and stirrer were removed and a short path distillation column was added. The remaining volatiles were removed by heating under reduced pressure for ~10 min. After cooling, the reaction mixture was dissolved with toluene (150 mL). The organic layer was washed with a 0.2 N aqueous sulfuric acid solution (2×100 mL) and brine (100 mL). The organic layer was recovered and concentrated under reduced pressure to afford an oil which was poured onto Teflon® coated aluminum foil to dry at 100° C. over night under reduced pressure yielding a substantially hydroxyl terminated glassy resin with a MW of 2622, an equivalent MW of 1,311 and a Tg of 32° C.

Example 5

1:4 NPG:TCDDM—To a 250 mL 3-neck round bottom flask equipped with an overhead stirrer, a distillation apparatus and a temperature probe was added neopentylglycol (NPG, 7.05 g, 67.7 mmol), 4,8-bis(hydroxymethyl)-tricyclo [5.2.1.0$^{2,6}$] decane (TCDDM, 53.17 g, 270.9 mmol) and a 25% sodium methoxide solution in methanol (1.09 g, 5 mmol) and the mixture heated to an internal reaction temperature of 80° C. Once this temperature was reached, diethyl carbonate (40 g, 339 mmol) was added in portions. Initially 15 mL of diethyl carbonate was added and the reaction heated to 123° C. for 30 min. After this time, additional diethyl carbonate (15 mL) was added while the reaction was maintained at 123° C. for a further 30 min. The remaining diethyl carbonate (11 mL) was added at 123° C. and stirred for 30 additional min. before the temperature was raised to 130° C. for 30 min and finally to 140° C. for 1 hr., during which time the distillate was continuously removed. After this time, the reaction was cooled to 105° C. and additional diethyl carbonate (~4.1 mL, 0.1 eq) was added, the reaction temperature was increased to 123° C. for 15 min, 130° C. for 15 min, 140° C. for 30 min, 150° C. for 15 min, 160° C. for 30 min, 180° C. for 30 min and finally 200° C. for 15 min. The reaction was diluted with toluene (120 mL) and heated to 175° C. for 45 min (93 mL toluene distillate was recovered). After this time, the reaction was allowed to cool down to 105° C. before diluting the reaction mixture with toluene (150 mL) to dissolve the polymer (with continued stirring). The organic layer was washed with a 0.2 N aqueous sulfuric acid solution (2×100 mL) and brine (100 mL). The organic layer was recovered and concentrated under reduced pressure to afford an oil which was poured onto Teflon® coated aluminum foil to dry at 100° C. over night under reduced pressure yielding an substantially hydroxyl terminated glassy solid composition with a MW of 2620, an equivalent MW of 1,310 and a Tg of 52° C.

Example 6

1:1 CHDM:HBPA—To a 250 mL 3-neck round bottom flask equipped with an overhead stirrer, a distillation apparatus and a temperature probe was added 1,4-bis(hydroxymethyl)cyclohexane (CHDM, 30.52 g, 211.63 mmol), hydrogenated bisphenol A (HBPA, 50.87 g, 211.63 mmol) and a 25% sodium methoxide solution in methanol (1.09 g, 5 mmol) and the mixture heated to an internal reaction temperature of 120° C. Once this temperature was reached, diethyl carbonate (40 g, 339 mmol) was added in portions over 30-40 min. After the addition was complete, the reaction was temperature was raised to 140° C. for 1 hr, 160 C for 1 hr and then 180 C for 30 min. while the distillate was collected. To the reaction was added toluene (in three portions, 5, 10, 10 ml) while temperature was maintained at 170° C. for 30 min. (10 mL toluene distillate was recovered). After this time, the reaction was allowed to cool down to 105° C. before diluting the reaction mixture with toluene (100 mL) to dissolve the polymer (with continued stirring). The organic layer was washed with a 0.2 N aqueous sulfuric acid solution (2×100 mL) and brine (100 mL). The organic layer was recovered and concentrated under reduced pressure to afford an oil which was poured onto Teflon® coated aluminum foil to dry at 110° C. under reduced pressure to give a substantially hydroxyl terminated composition with a Mn of 2088 and a Tg of 51° C.

Example 7

Large Scale Synthesis of 1:4 CHDM:TCDDM—A 10 CV helicone was charged with 4,8-bis(hydroxymethyl)tricyclo (5.2.1.0$^{2,6}$)decane (11.33 Kg, 57.7 mol), 1,4-bis(hydroxymethyl)cyclohexane (2.08 Kg, 14.4 mol), diethyl carbonate (9.8 Kg, 83 mol) and 25% sodium methoxide (156 g, 0.7 mol) in methanol under a nitrogen atmosphere. The reactor was stirred 130 C for 1 hr followed by 140° C. for 1 hr while the distillate was collected. Then 450 g of diethyl carbonate was added 4 times every 15 min. while the distillate was being collected. The reactor was heated to 160° C. over 10 min. After ~30 min. at 160 C, the pressure on the reactor was slowly lowered to 8 mm over ~1.25 hrs while ethanol and excess diethyl carbonate were removed. The pressure on the reactor was again reduced to ~0.5 mm for 1 hr after which time the product was removed from the reactor. After cooling, the resin was dissolved in methylene chloride and 2 NHCL. The HCL was added to obtain a pH of 1-3. The aqueous layer was removed and the organic layer was washed with multiple water washes in liquid-liquid centrifuges. The resin was isolated by removing the solvent under reduced pressure and drying overnight under reduced pressure at ~80° C. The sample had Mn of 8500 by proton NMR and a Tg of 65° C. The proton NMR indicated that the end groups were 75% OH. The equivalent MW was ~5600.

Solvent Cast Coating Preparation

Coatings were prepared using a solution casting process to evaluate the properties of the compositions (Table 1). The aliphatic polycarbonate resins were dissolved to 29 wt % in toluene at 40° C. then passed through a coarse fritted filter to remove any insoluble fractions. In compositions where high levels of weathering are especially important, light stabilizers were additionally added. After cooling to room temperature free isocyanate crosslinking agent was mixed into the solution along with 0.5 wt % of a fluoro surfactant (FC4430, 3M) to aid with substrate wetting. Coatings were cast in a fume hood using a 10 mil doctor blade and allowed to dry for 1 hour at room temperature before transferring to a 50° C. convection oven for 1 hour. Once dry, the coatings were cured at 190° C. for 20 minutes. The nominally 2 mil thick coatings were allowed to equilibrate for 12 hours in a humidity controlled room before testing.

TABLE 1

Solvent Cast Formulations And Accelerated Weathering Results

| Example | Aliphatic Carbonate | | phr % Used | of Stabilizer Additive | 60 Degree Gloss Level | |
|---------|---------|---------|------|----------|---------|-------|
| | Source | Composition | a. | | Initial | Final, d. |
| 8 | Example 3 | 1:1 CHDM:TCDDM | 87.6 | 0 | 132 | e. |
| 8A | Example 3 | 1:1 CHDM:TCDDM | 87.6 | 1, b. | 115 | 115 |
| 8B | Example 3 | 1:1 CHDM:TCDDM | 87.6 | 1, c. | 106 | 111 |
| 9 | Example 4 | 1:1 CHDM:TMCBD | 86.7 | 0 | 127 | 25 |
| 9A | Example 4 | 1:1 CHDM:TMCBD | 86.7 | 1, b. | 110 | 113 |
| 9B | Example 4 | 1:1 CHDM:TMCBD | 86.7 | 1, c. | 105 | 110 |
| 10 | Example 2 | 1:4 CHDM TCDDM | 89.8 | 0 | 96 | f. |

TABLE 1-continued

Solvent Cast Formulations And Accelerated Weathering Results

| Example | Aliphatic Carbonate | | phr | | 60 Degree Gloss Level | |
|---|---|---|---|---|---|---|
| | Source | Composition | % Used a. | of Stabilizer Additive | Initial | Final, d. |
| 10A | Example 2 | 1:4 CHDM TCDDM | 89.8 | 1, b. | 109 | 106 |
| 10B | Example 2 | 1:4 CHDM TCDDM | 89.8 | 1, c. | 129 | 134 |
| 11 | Example 5 | 1:4 NPG:TCDDM | 86.7 | 0 | 130 | g. |
| 11A | Example 5 | 1:4 NPG:TCDDM | 86.7 | 1, b. | 134 | 143 |
| 11B | Example 5 | 1:4 NPG:TCDDM | 86.7 | 1, c. | 130 | 137 | a. The remaining percentage was Desmodur ™ N3600, an HDI based polyisocyanate obtained from Bayer.
b. Light stabilizer additive = Tinuvin ™ 152
c. Light stabilizer additive = Tinuvin ™ 770
d. 60 Degree Gloss reading after ~14,000 KJ/m² of exposure in a Xenon Arc Weather-O-Meter.
e. Film failed at ~14,000 kJ/m² with the gloss level at of ~2 at 13,000 kJ/m².
f. Film failed at ~9,000 kJ/m² with the gloss level at of ~3 at 7,500 kJ/m².
g. Film failed at ~9,000 kJ/m² with the gloss level at of ~3 at 7,500 kJ/m².

Weatherability Testing

Coatings were subjected to xenon arc accelerated weathering in an Atlas Ci5000 weather-o-meter to monitor color stability, gloss retention, and erosion rate (Table 1). Test protocol included 108 minutes of light exposure, 12 minutes of water spray in darkness; with the light intensity set to 0.65 W/m. (Pickett, J, and Umamaheswaran, V. SAE 2003-03M-73).

The 60 Degree Gloss Level data shows that these compositions have good resistance to degradation on UV exposure. Compositions that included the added light stabilizer additives had especially good resistance to degradation.

Powder Coating Preparation

All powder-coating formulations were dry-mixed in a Waring™ commercial blender (Model: HGB SS) at a batch size of approximately 300 grams. Powder mixtures were then homogenized with a 19 mm twin-screw extruder (APV Baker, Model: MP19) run at 300 rpm with a melt temperature of approximately 100° C. Powder grinding was performed with an air-classifying mill (CMS) operating at a relative speed of 140 Hz and a feed rate of 20 Hz. Powder was sieved through an 86 micron (200 mesh) ultrasonic screen prior to electrostatic application.

All powders were applied in an ETI Flexicoat manual powder coating booth (Nordson) using an ITW Gema electrostatic gun with gravity cup attachment. The gun was operated at a voltage of 100 KV with a current of 35 µA. The powder output level was set at 30, while 30 psi of nitrogen was used as conveying gas. A total of six spray passes were made on each panel, yielding an average cured film build between 45 to 55 microns as measured with a magnetic-induction thickness gauge (Elektro Physik MiniTest 4100). Coatings were cured in a Blue-M convection oven at 190° C. for 20 minutes (with 4 minutes added for temperature ramp), and stored in a humidity-controlled room (50% relative humidity) overnight before testing.

The 1:4 CHDM:TCDDM aliphatic polycarbonate prepared in Example 2 was further used to prepare powder coatings. The clear powder coatings were crosslinked with 10% stoichiometric excess ε-caprolactam blocked, IPDI based polyisocyanate (average functionality of 2.5) from Bayer (Crelan™ VPLS 2256). To aid flow and film formation 1 wt % Powdermate™ 570FL (Troy) was added to the formulation. Also, 0.5 wt % Benzoin™ (Solutia) was added to the coating formulations to aid degassing of the ε-caprolactam blocking agent, which is volatilized during cure. Further, 1 wt % each of HALS (Tinuvin™ 152) and UVA (Tinuvin™ 1577) were added to the formulation to stabilize coatings upon UV exposure. A zinc complex catalyst (K-Kat XK602, King Industries) was determined necessary to aid de-blocking of the ε-caprolactam group at a cure temperature of 190° C. Coating formulations, including weight percent zinc catalyst are presented in Table 2.

TABLE 2

Powder Coating Formulations

| Example | Resin Equiv. MW | Weight % Base Resin | Weight % Crosslinking Agent | Weight % Zinc Cat. |
|---|---|---|---|---|
| 12 | 1292 | 77.3 | 19 | 0.2 |
| 13 | 1333 | 77.8 | 18.5 | 0.2 |
| 14 | 1333 | 78.2 | 18.1 | 0.2 |
| 15 | 1567 | 80.1 | 16.2 | 0.2 |
| 16 | 1333 | 77.5 | 18.4 | 0.6 |

Coating Aesthetics

The powder clear coatings were evaluated for smoothness on the PCI scale (Powder Coating Institute, 1 to 10), with 10 having the highest quality (minimal orange peel), with results summarized in Table 3. Generally, the aliphatic polycarbonate coatings achieved PCI ratings greater than 6, with Example 14 reaching 7.6 on the scale. Further, none of the aliphatic polycarbonate coatings experienced crater defects. All powder coatings demonstrated 20° and 60° gloss levels greater than 100%. Further, all coatings had clarity values >98% and total transmission >93%.

TABLE 3

Powder Coating Aesthetics

| | PCI | Gloss | | Color | Opacity | | |
|---|---|---|---|---|---|---|---|
| Example | Rating (1-10) | 20° | 60° | b* | % Clarity | % Haze | % Transmission |
| 12 | 7.2 | 116 | 128 | 1.4 | 99 | 2.6 | 94 |
| 13 | 6.8 | 113 | 126 | 2.5 | 99 | 1.3 | 94 |
| 14 | 7.6 | 115 | 126 | 3.2 | 99 | 1.7 | 94 |

TABLE 3-continued

Powder Coating Aesthetics

| | PCI | | | | Opacity | |
|---|---|---|---|---|---|---|
| | Rating | Gloss | | Color | % | % | % |
| Example | (1-10) | 20° | 60° | b* | Clarity | Haze | Transmission |
| 15 | 6.7 | 103 | 121 | 2.5 | 98 | 3.0 | 93 |
| 16 | 6.2 | 114 | 126 | 4.6 | 99 | 1.2 | 93 |

Mar and Scratch Resistance

The results of the mar and scratch resistance testing are summarized in Table 4. All powder coatings demonstrated pencil hardness ratings (mar and scratch) that passed the 2H rating.

TABLE 4

Pencil Hardness Properties

| | Pencil Hardness | |
|---|---|---|
| Example | Mar | Scratch |
| 12 | 3H | 3H |
| 13 | 2H | 2H |
| 14 | 2H | 2H |
| 15 | 3H | 3H |
| 16 | 2H | 2H |

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

The invention claimed is:

1. A composition and a method of forming a coated substrate comprising:
   (i) an aliphatic or cycloaliphatic polycarbonate or a combination including at least one of the foregoing polycarbonates, and wherein the polycarbonate has repeating carbonate units of Formula II:

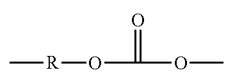

Formula II wherein R is a divalent $C_1$-$C_{30}$ aliphatic radical or a divalent $C_3$-$C_{30}$ cycloaliphatic radical,
   wherein the polycarbonate includes at least one reactive hydroxyl group, said the polycarbonate is derived from a compound of formula I

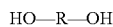  Formula I wherein R is a divalent $C_1$-$C_{30}$ aliphatic radical or a divalent $C_3$-$C_{30}$ cycloaliphatic radical;
   wherein the polycarbonate has an equivalent molecular weight in a range from 500 grams per mole to 10,000 grams per mole, further wherein the polycarbonate has a $T_g$ in a range from 25° C. to 100° C., further wherein the polycarbonate is present in an amount corresponding to from 30 weight percent to 90 weight percent of a total weight of the composition; and
   (ii) an isocyanate crosslinking agent having at least one isocyanate functional group, wherein a ratio of isocyanate functional groups to reactive hydroxyl groups of the polycarbonate is in a range of from 0.5:1 to 1.5:1, wherein the composition is a curable powder coating composition.

2. The composition of claim 1, wherein the composition contains from 0.5 to 5 mol percent of a branching agent selected from tri- and tetra-primary functional alcohols or a combination including at least one of the foregoing compounds.

3. The composition of claim 1, wherein the compound of formula I is a linear or cyclic aliphatic alcohol selected from neopentyl glycol, hexane diol, hydrogenated bisphenol A, cyclohexanediol, cyclohexane dimethanol, decahydronaphthalene dimethanol, norbornene dimethanol, tetramethylcyclobutanediol, tricyclodecane dimethanol, isosorbide or a combination including at least one of the foregoing compounds.

4. The composition of claim 1, wherein the compound of formula I includes a combination of tetramethylcyclobutanediol and either neopentyl glycol or cyclohexane dimethanol.

5. The composition of claim 1, wherein the compound of formula I includes a combination of hydrogenated bisphenol A and either neopentyl glycol or cyclohexane dimethanol.

6. The composition of claim 1, wherein the compound of formula I includes a combination of tricyclodecanedimethanol and cyclohexane dimethanol, and the hydroxyl equivalent molecular weight of the polycarbonate is from 1,000 to 7,000 and wherein the composition further contains at least one hindered amine light stabilizer that contains 2,2,6,6-tetramethylpiperidine moiety.

7. The composition of claim 1, wherein the isocyanate crosslinking agent is selected from hexamethylene diisocyanate, isophorone diisocyanate, 4,4'-dicyclohexyl methane diisocyanate, blocked derivatives therefrom, or a combination including at least one of the foregoing isocyanate crosslinking agents.

8. The composition of claim 1, wherein the Tg of the polycarbonate is in the range of from 50° C. to 80° C.

9. The composition of claim 1, wherein the equivalent molecular weight of the polycarbonate is in a range from 500 grams per mole to 7,000 grams per mole.

10. The composition of claim 1, further comprising at least one additive selected from gloss reducing additives, cure catalysts, flow and leveling agents, degassing additives, adhesion promoters, dispersion aids, flame-retardant agents, heat stabilizers, light stabilizers, antioxidants, plasticizers, antistat agents, UV absorbers, lubricants, pigments, dyes, colorants, or combinations including one or more of the foregoing.

11. The composition of claim 10, wherein at least one of the light stabilizers is a hindered amine light stabilizer that contains 2,2,6,6-tetramethylpiperidine moiety.

12. The composition of claim 11, wherein at least one of the light stabilizers is selected from bis(2,2,6,6-tetramethyl-4-piperidyl) sebacate, 2-[(2-Hydroxyethyl)amino]-4,6-bis[N-(1cyclohexyloxy-2,2,6,6-tetramethylpiperidin-4-yl)]butylamino-1,3,5-triazine, or a combination thereof.

13. The composition of claim 1, wherein the polycarbonate is present in an amount corresponding to from 65 weight percent to 85 weight percent of a total weight of the composition.

14. A cured composition comprising the composition of claim 1.

15. A substrate coated with the composition of claim 1.

16. A method of forming a coated substrate comprising:
(a) providing a substrate;
(b) coating the substrate with a curable coating composition to provide a curable coated substrate, wherein the curable coating composition comprises:
(i) an aliphatic or cycloaliphatic polycarbonate or a combination including at least one of the foregoing polycarbonates, and wherein the polycarbonate has repeating carbonate units of Formula II:

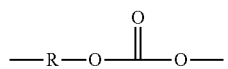
Formula II wherein R is a divalent $C_1$-$C_{30}$ aliphatic radical or a divalent $C_3$-$C_{30}$ cycloaliphatic radical,
wherein the polycarbonate includes at least one reactive hydroxyl group, said the polycarbonate is derived from a compound of formula I

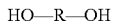
Formula I wherein R is a divalent $C_1$-$C_{30}$ aliphatic radical or a divalent $C_3$-$C_{30}$ cycloaliphatic radical; wherein the polycarbonate has an equivalent molecular weight in a range from 500 grams per mole to 10,000 grams per mole, further wherein the polycarbonate has a $T_g$ in a range from 25° C. to 100° C., further wherein the polycarbonate is present in an amount corresponding to from 30 weight percent to 90 weight percent of a total weight of the composition; and
(ii) an isocyanate crosslinking agent having at least one isocyanate functional group, wherein a ratio of isocyanate functional groups to reactive hydroxyl groups of the polycarbonate is in a range of from 0.5:1 to 1.5:1; and (c) curing the curable coating composition at a temperature ranging from 100° C. to 250° C.

17. The method of claim 16, wherein the coating is applied electrostatically using either a spray coating or fluidized bed coating and is then cured under heat to flow and form the resulting coating.

18. The method of claim 16, wherein the compound of formula I is selected from neopentyl glycol, hexane diol, hydrogenated bisphenol A, cyclohexanediol, cyclohexane dimethanol, decahydronaphthalene dimethanol, norbornene dimethanol, tetramethylcyclobutanediol, tricyclodecane dimethanol, isosorbide or a combination including at least one of the foregoing compounds.

19. The method of claim 16, wherein the isocyanate crosslinking agent is selected from hexamethylene diisocyanate, isophorone diisocyanate, 4,4'-dicyclohexyl methane diisocyanate, blocked derivatives thereof, or a combination including at least one of the foregoing isocyanate crosslinking agents.

20. The method of claim 16, wherein the Tg of the polycarbonate is in the range of from 50° C. to 80° C.

21. The method of claim 16, wherein the equivalent molecular weight of the polycarbonate is in a range from 500 grams per mole to 7,000 grams per mole.

22. The method of claim 16, wherein the curable coating composition further comprises at least one additive selected from gloss reducing additives, cure catalysts, flame-retardant agents, heat stabilizers, light stabilizers, antioxidants, plasticizers, antistat agents, UV absorbers, lubricants, pigments, dyes, colorants, or combinations including one or more of the foregoing additives.

23. The method of claim 16, wherein the polycarbonate is present in an amount corresponding to from 65 weight percent to 85 weight percent of a total weight of the composition.

24. An article made by the method of claim 16.

* * * * *